US011655983B2

(12) United States Patent
Murad et al.

(10) Patent No.: US 11,655,983 B2
(45) Date of Patent: May 23, 2023

(54) DUAL COOKING APPLIANCE

(71) Applicant: Team International Group of America Inc., Miami Gardens, FL (US)

(72) Inventors: Uri Murad, Hollywood, FL (US); Laurent Bardot, Miramar, FL (US); Maik Pezold, Guangdong (CN)

( * ) Notice: Subject to any disclaimer, the term of this patent is extended or adjusted under 35 U.S.C. 154(b) by 0 days.

(21) Appl. No.: 17/954,513

(22) Filed: Sep. 28, 2022

(65) Prior Publication Data
US 2023/0020018 A1    Jan. 19, 2023

Related U.S. Application Data

(60) Continuation-in-part of application No. 17/679,528, filed on Feb. 24, 2022, which is a continuation-in-part of application No. 17/567,535, filed on Jan. 3, 2022, now Pat. No. 11,585,536, which is a division of application No. 17/518,876, filed on Nov. 4, 2021, now abandoned, said application No. 17/679,528 is a continuation-in-part of application No. 17/389,225, filed on Jul. 29, 2021, said application No. 17/518,876 is a continuation-in-part of application No. 17/176,838, filed on Feb. 16, 2021, now Pat. No. 11,175,048, said application No. 17/389,225 is a continuation-in-part of application No. 17/176,838, filed on Feb. 16, 2021, now Pat. No. 11,175,048.

(60) Provisional application No. 63/062,541, filed on Aug. 7, 2020, provisional application No. 62/982,999, filed on Feb. 28, 2020.

(51) Int. Cl.
*F24C 7/08* (2006.01)
*G05D 23/19* (2006.01)
*F24C 15/16* (2006.01)
*F24C 15/32* (2006.01)

(52) U.S. Cl.
CPC ............ *F24C 7/085* (2013.01); *F24C 15/166* (2013.01); *F24C 15/325* (2013.01); *G05D 23/1931* (2013.01)

(58) Field of Classification Search
None
See application file for complete search history.

(56) References Cited

U.S. PATENT DOCUMENTS

| | | |
|---|---|---|
| 5,938,959 A | 8/1999 | Wang |
| 7,071,448 B1 | 7/2006 | Kim et al. |
| 7,417,204 B2 | 8/2008 | Nam et al. |
| 7,708,008 B2 | 5/2010 | Elkasevie et al. |
| 8,381,712 B1 | 2/2013 | Simms |
| 8,584,663 B2 | 11/2013 | Kim et al. |

(Continued)

FOREIGN PATENT DOCUMENTS

| | | |
|---|---|---|
| CN | 102551518 | 2/2014 |
| CN | 107559904 | 1/2018 |

(Continued)

OTHER PUBLICATIONS

See co-filed Appendix.

*Primary Examiner* — Jason Lau
(74) *Attorney, Agent, or Firm* — Frank Marino

(57) ABSTRACT

A cooking appliance is adapted to perform either as a single large fan-forced convection oven capable of cooking a larger food, or as smaller independently-operable fan-forced convection ovens each capable of cooking smaller foods. Features of the cooking element arrangement provide faster, more efficient, and higher quality results regardless of the size and amount of food being cooked.

18 Claims, 10 Drawing Sheets

(56) References Cited

U.S. PATENT DOCUMENTS

| | | |
|---|---|---|
| 8,878,106 B2 | 11/2014 | Hensel et al. |
| 9,255,712 B2 | 2/2016 | Yantis et al. |
| 9,756,981 B2 | 9/2017 | Fung |
| 9,777,927 B2 | 10/2017 | Armstrong et al. |
| D858,172 S | 9/2019 | Moore |
| 2006/0096969 A1 | 5/2006 | Kim |
| 2007/0170183 A1 | 7/2007 | Hannan et al. |
| 2012/0160823 A1 | 6/2012 | Bryce et al. |
| 2012/0180775 A1 | 7/2012 | Waltz et al. |
| 2015/0096550 A1 | 4/2015 | Paler et al. |
| 2015/0101592 A1 | 4/2015 | Cadima |
| 2017/0245683 A1 | 8/2017 | Chen et al. |
| 2017/0328573 A1 | 11/2017 | Wojick et al. |
| 2018/0220842 A1 | 8/2018 | Delrue et al. |
| 2019/0374059 A1 | 12/2019 | Samonigg et al. |
| 2020/0072475 A1 | 3/2020 | Crow et al. |
| 2021/0212506 A1 | 7/2021 | Martin et al. |
| 2021/0310663 A1 | 10/2021 | Tedeschi |

FOREIGN PATENT DOCUMENTS

| | | |
|---|---|---|
| CN | 210354396 | 3/2019 |
| CN | 11085923 | 11/2019 |
| CN | 110664270 | 1/2020 |
| EP | 2026014 | 2/2009 |
| WO | WO2012007681 | 1/2012 |
| WO | WO2018019766 | 1/2018 |

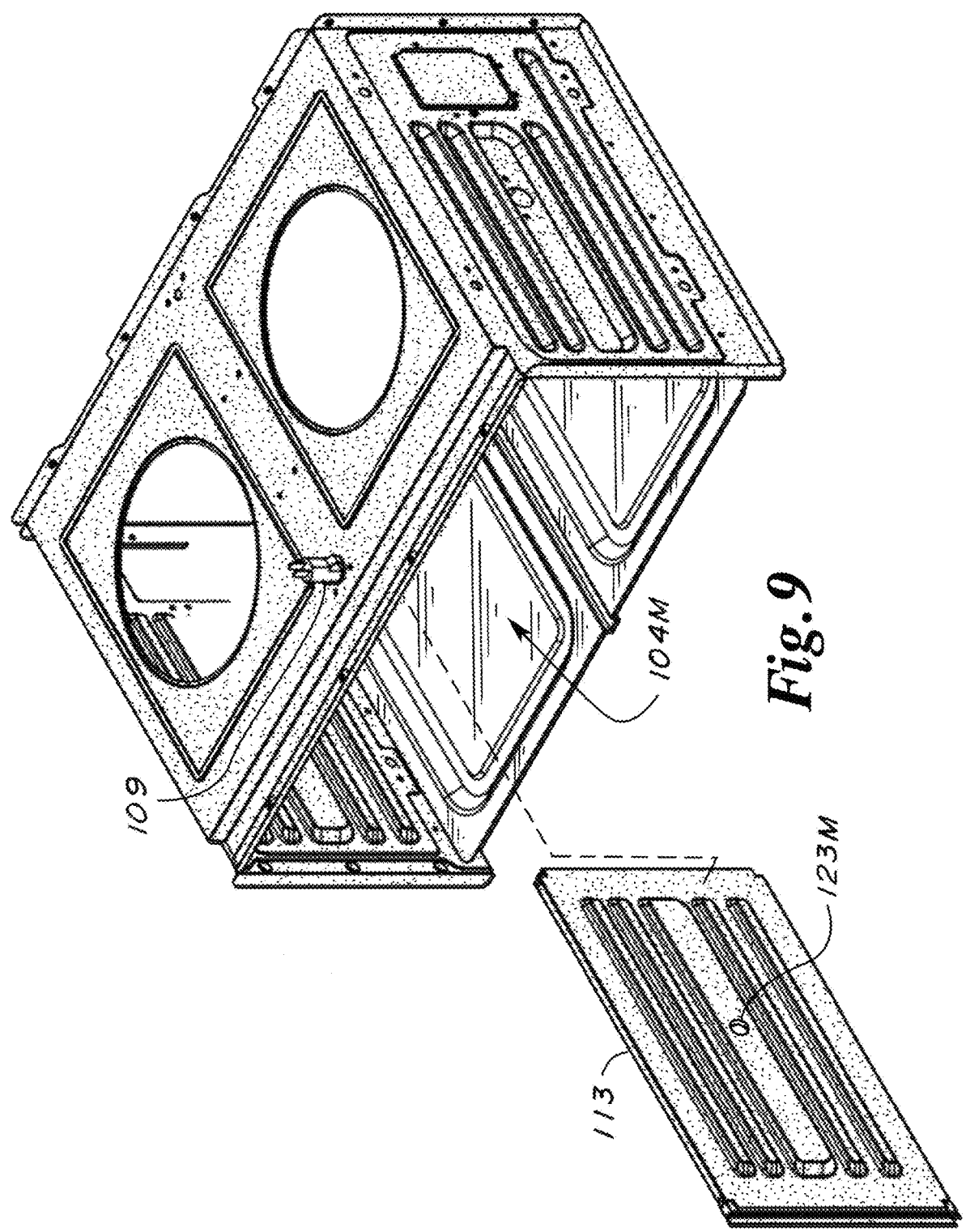

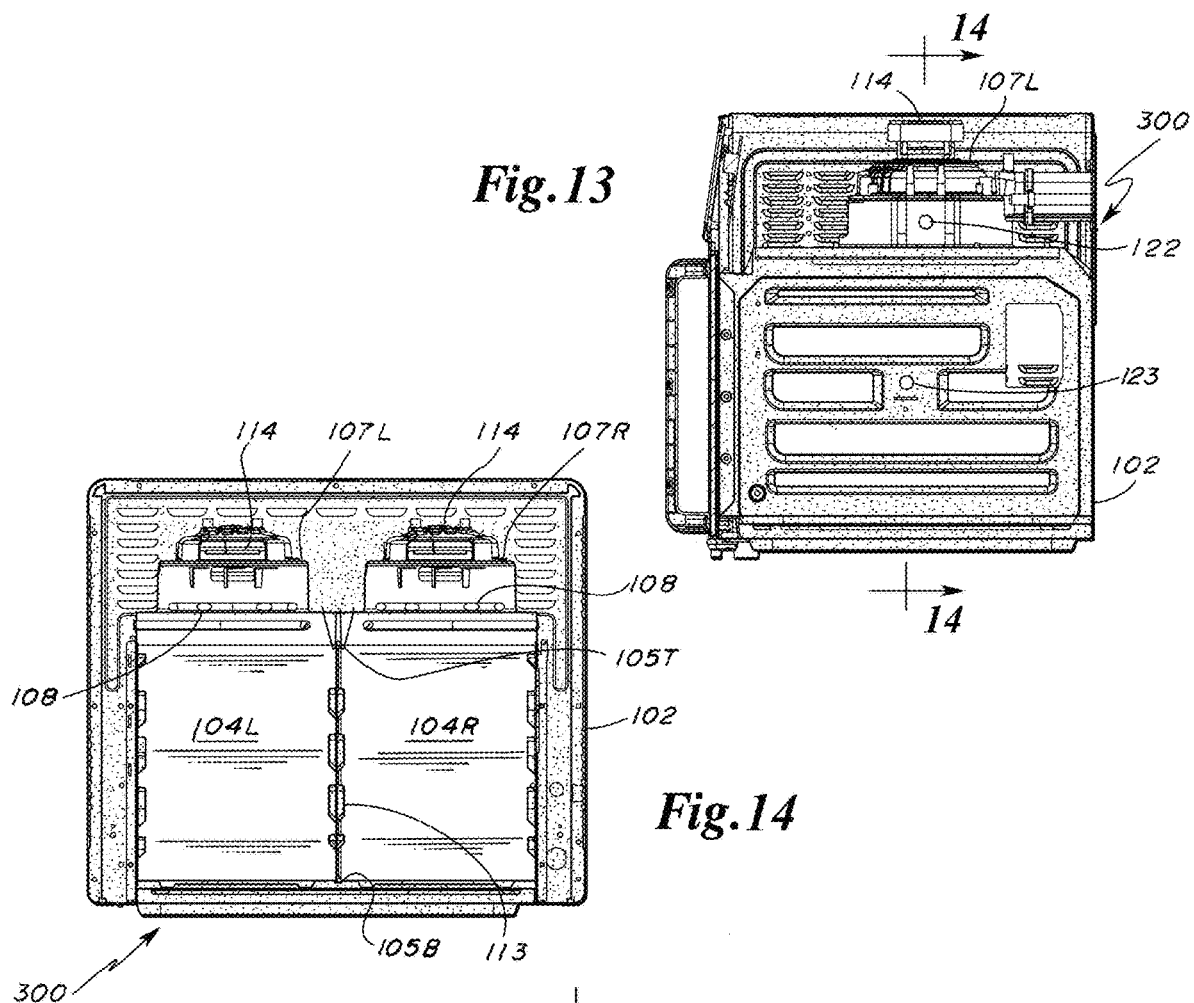
*Fig.13*
*Fig.14*
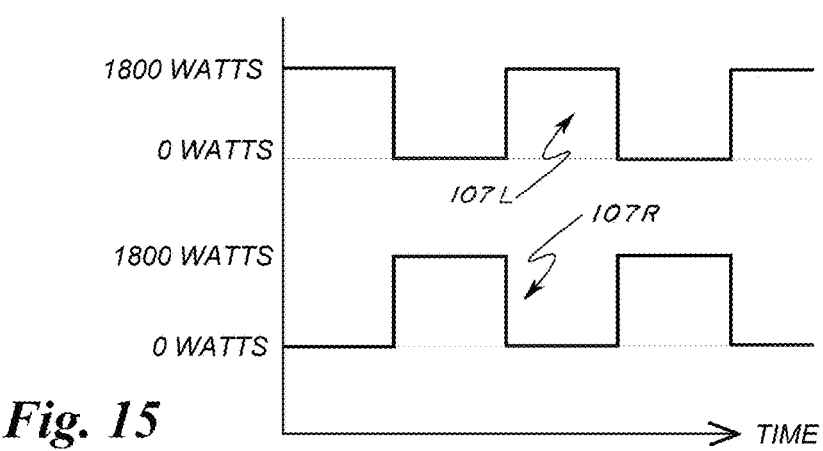
*Fig. 15*

DUAL COOKING APPLIANCE

FIELD OF THE INVENTION

The invention relates to cooking appliances. More specifically, it relates to countertop electric ovens, particularly having versatility to function as a single oven for cooking larger, or as one or more side-by-side independently-operable ovens for cooking smaller foods.

BACKGROUND

Electric ovens are well-known and one common variety is the fan-forced convection oven. Fan-forced convection ovens include an air heater and a fan. The turbulence by the fan of the cooking air heated by the heater provides faster and more even cooking.

Air fryers are well-known and are an extreme form of fan-forced convection oven in which higher temperature air at a higher airflow rate is applied to oily food or food that has been coated in oil to brown the food in a manner that mimics the browning, crispiness, and flavor of deep frying, but without the mess, danger, and calories.

It is well known that fan-forced convection ovens are most efficient, cook faster, and cook food of a better quality when the oven's cooking cavity size and shape are proportional to the amount of food being cooked therein. When cooking a small portion of food in a large oven, heated airflow is hard to control the food is less evenly cooked and energy that would be best focused on cooking is wasted heating a mostly empty cooking chamber. Users who sometimes cook smaller portions and sometimes cook larger foods are therefore forced to purchase a large oven and a separate small oven individually to obtain optimal results, increasing cost, decreasing convenience. and requiring additional valuable storage and countertop space.

It is found through experience and experimentation that fan-forced convection ovens, which typically have only a single air heating element typically located in the top of the cooking chamber are prone to unheated hot air distribution. This is because, by the time the heated air reaches the underside of the food, its temperature has dropped. While the drop is small, it is not insignificant, as it results in the top surfaces of the cooked food being more cooked, crispier, and more browned than the bottom surfaces.

There exists the need to provide, and such may be an object of the invention, an apparatus which can function as a single oven for cooking larger foods, or as one or more adjacent independently-operable ovens for cooking smaller foods.

There exists the need to provide, and such may be an additional object of the invention, such an apparatus which can be converted between these functions quickly and simply.

There exists the need to provide, and such may be an additional object of the invention, for such an apparatus to function as a more effective and efficient fan-forced convection oven.

There exists the need to provide, and such may be an additional object of the invention, for such an apparatus to cook food evenly, quickly, and efficiently regardless of the size or amount of the food portion.

There exists the need to provide, and such may be an additional object of the invention, such an apparatus with is adapted to recognize which of these functions it is arranged to perform for the desired cooking requirement and to operate accordingly.

Further needs and objects of the invention will become apparent upon a review of the following disclosure of an exemplary embodiment.

SUMMARY OF THE INVENTION

The invention may be embodied in or practiced using a cooking appliance which can selectively perform as a larger fan-forced convection oven for cooking larger foods, or as a plurality of smaller independently-operable fan-forced convection ovens for cooking a plurality of smaller foods.

The invention may be embodied in or practiced using a cooking appliance adapted to perform either as a single primary fan-forced convection oven of a first volume, capable of cooking foods of a first size, or as two secondary independently-operable fan-forced convection ovens of volumes smaller than the first volume, each only capable of cooking foods of sizes smaller than the first size, and including a housing defining a primary cooking cavity including two cooking element systems, two independently operable access doors, and one user-installable and removable separation panel.

The appliance may include two independently-operable sub-controllers, each associated with and adapted to independently operate one of the cooking element systems, a primary controller associated with and adapted operate both of the cooking element systems as a synchronized single primary system.

The appliance may include a sensor or switch adapted to communicate the presence or absence of the separation panel to the controller and sub-controllers, and a multi-function user interface communicating with the controller and sub-controllers to provide either a first interface arrangement associated with only the primary cooking cavity and primary controller during absence of the separation panel or a secondary interface arrangement associated with only the secondary cooking cavities and the sub-controllers during presence of the separation panel.

The separation panel, when present, may be adapted to divide the primary cooking cavity into two separate secondary cooking cavities, each secondary cooking cavity including one of the cooking element systems and each secondary cooking cavity being accessible through only one of the access doors Each cooking element system may include a top air heating element assembly disposed within an upper portion of its associated secondary cooking cavity and a bottom air heating element disposed within a lower portion of its associated secondary cooking cavity, both adapted to heat air within either the primary cooking cavity or its associated one of the secondary cooking cavities.

The separation panel may be a vertical wall installable centrally in the primary cooking cavity between the cooking element systems.

Each top air heating element assembly may include a circular heating element in cooperation with a fan and adapted together to heat and turbulize the air within the primary cooking cavity or that associated one of the secondary cooking cavities and adapted to direct the heated and turbulized air downward and parallel to the access doors.

The two independently operable access doors may abut at a vertical seam aligned with the vertical wall and open horizontally outwardly therefrom such that the opening of one of the doors only allows access to a single associated one of the secondary cooking cavities to only allow escape of the heated and turbulized air of that cavity.

Each sub-controller may control functions of its associated cooking element system including one or more of temperature, heating wattage, cooking time, and fan speed. The functions of each cooking element system may be independently controlled of the functions of the other during absence of the separation panel.

The sensing of an absence of the separator panel by the separator panel sensor may enable the primary controller to cause the synchronization of the functions of both sub-controllers so that the appliance operates as the synchronized single primary fan-forced convection oven employing the primary cooking cavity and both of the cooking element systems. The synchronization of the functions of both sub-controllers my cause the functions of both of the cooking element systems equally as a singular primary cooking element system. The functions of the singular primary cooking element system may include one or more of temperature, heating wattage, cooking time, and fan speed.

The sub-controllers may be adapted to limit individual wattage consumption by the cooking element systems when enabled, and the primary controller may be adapted to limit wattage consumption by the primary cooking element system when enabled, such that a total wattage consumption does not exceed the maximum wattage consumption. The maximum wattage consumption may be that allowed for a 15 A electric circuit.

The two independently-operable access doors may be horizontally-opening French doors. Each of the independently-operable horizontally opening French doors may enable access to only its associated one of the cooking cavities. As used herein, the term "French doors" is defined as two adjoining doors hinged at opposite sides of an opening to open away from each other.

Further features and aspects of the invention are disclosed with more specificity in the Description and Drawings provided herein and showing exemplary embodiments of the invention.

BRIEF DESCRIPTION OF THE DRAWINGS

Exemplary embodiments of fan-forced convection ovens in accordance with or useful in practicing the invention are shown in the accompanying Drawings, of which;

FIG. 9 is a partial exploded view of the oven of FIG. 1;

FIG. 13 is a side cross-sectional view of a third oven;

FIG. 14 is a front cross-sectional view of the oven of FIG. 13 taken at line 14-14 of FIG. 13;

FIG. 15 is a graph of a voltage cycling arrangement for the heating elements of the embodiments of FIG. 1 or 13;

DESCRIPTION OF AN EXEMPLARY EMBODIMENT

Figure 1:
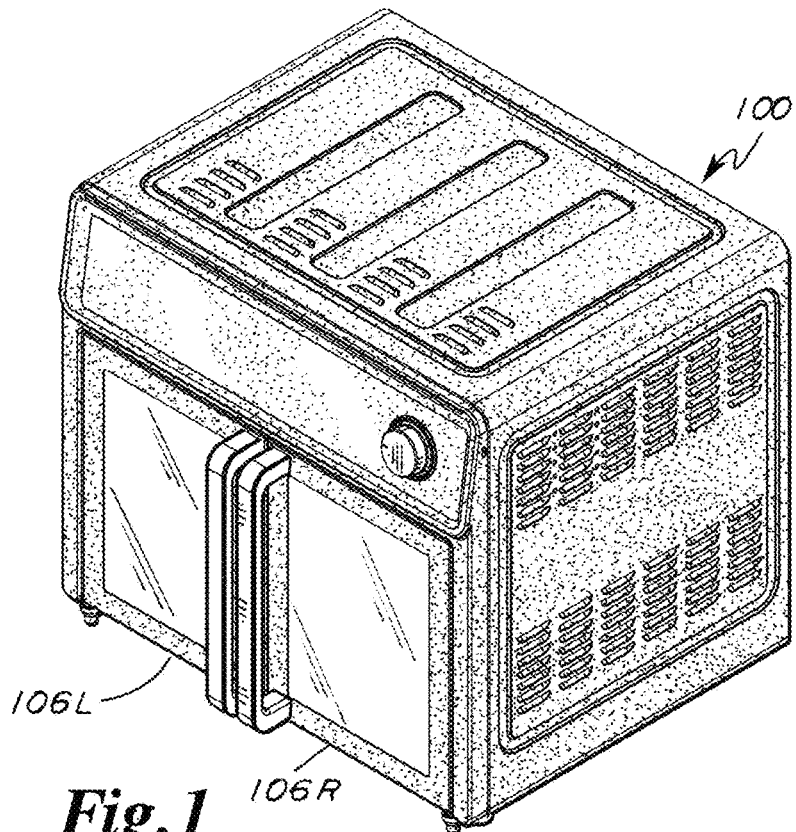
FIG. 1 is a perspective view of a first oven.
Figure 2:
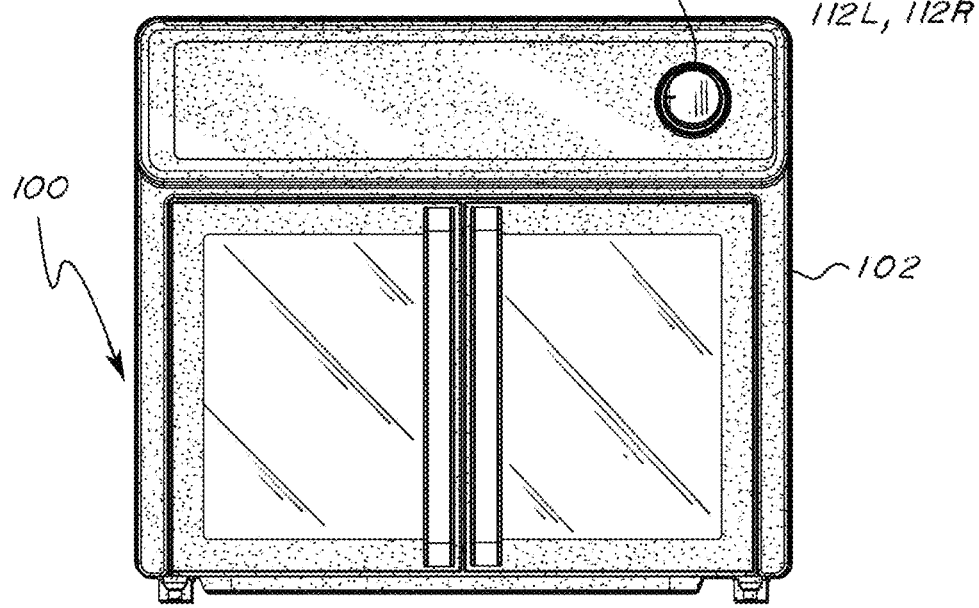
FIG. 2 is a front view of the oven of FIG. 1 in its closed state.
Figure 3:
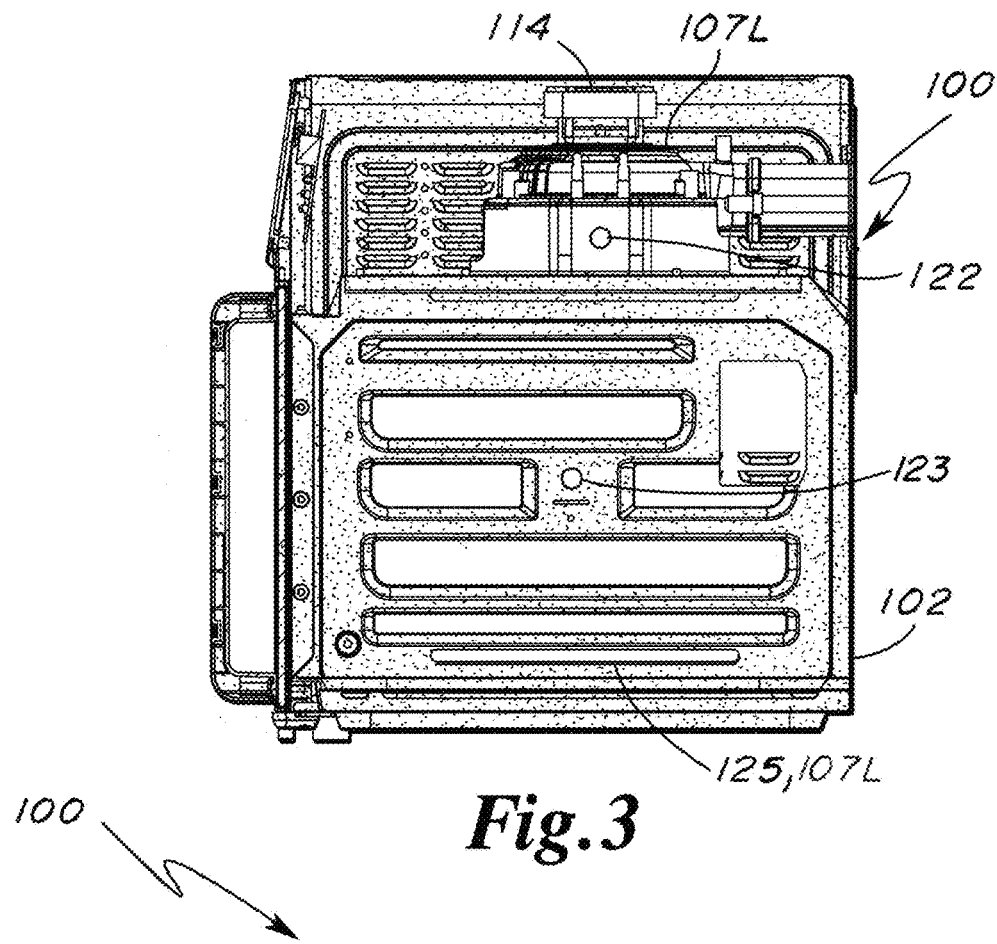
FIG. 3 is a side cross-sectional view of the oven of FIG. 1 taken al line 3-3 of FIG. 2.
Figure 4:
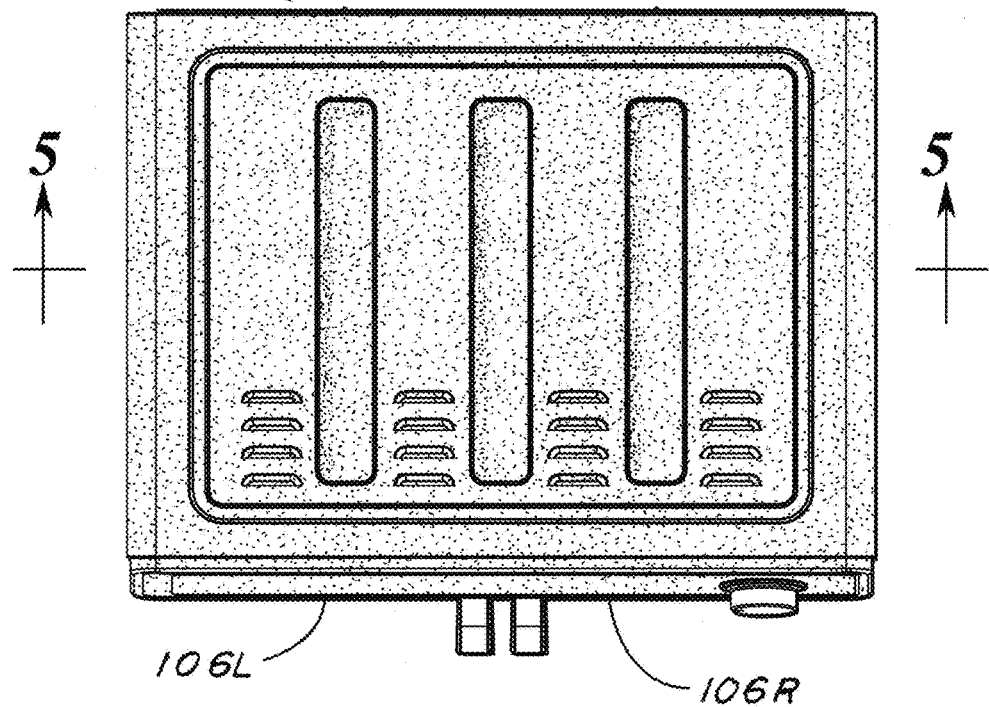
FIG. 4 is a top view of the oven of FIG. 1 in its closed state.
Figure 5:
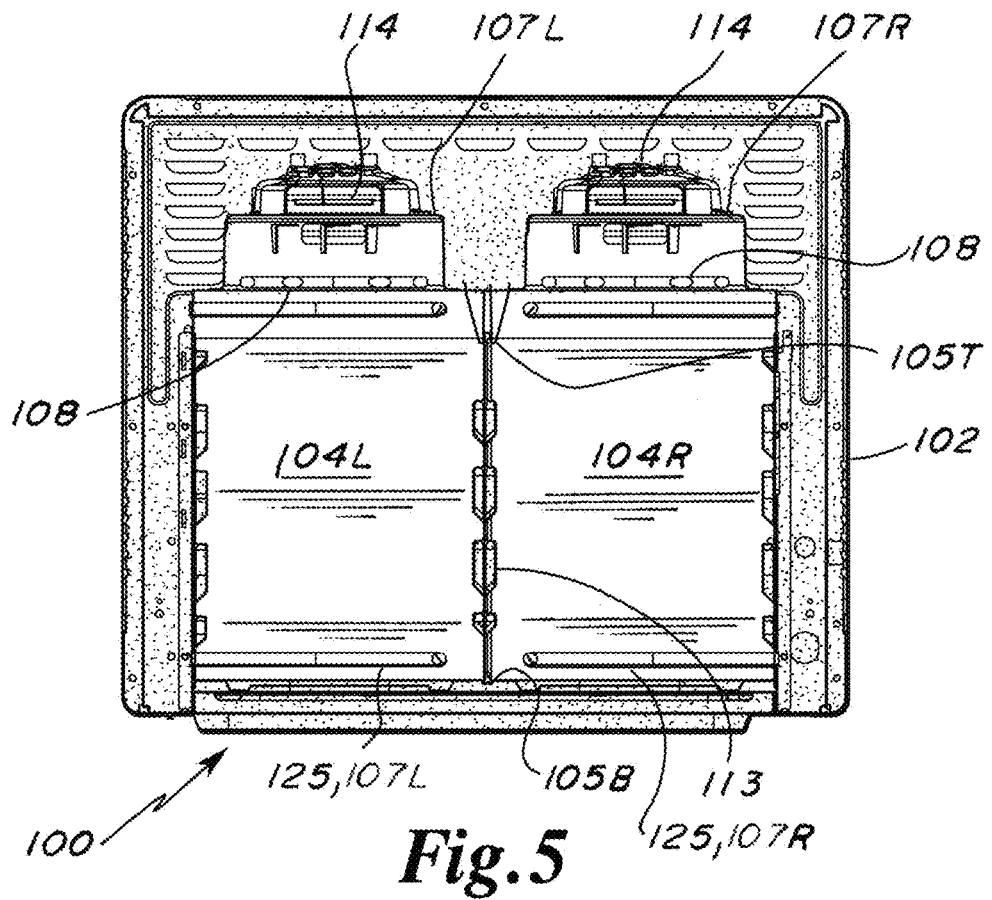
FIG. 5 is a front cross-sectional view of the oven of FIG. 1 taken at line 5-5 of FIG. 4.
Figure 6:
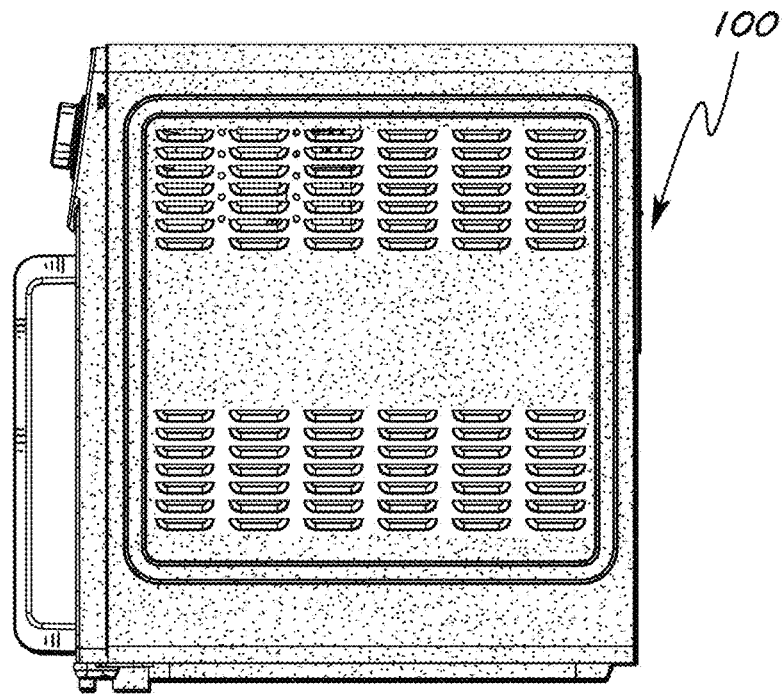
FIG. 6 is a side view of the oven of FIG. 1.
Figure 7:
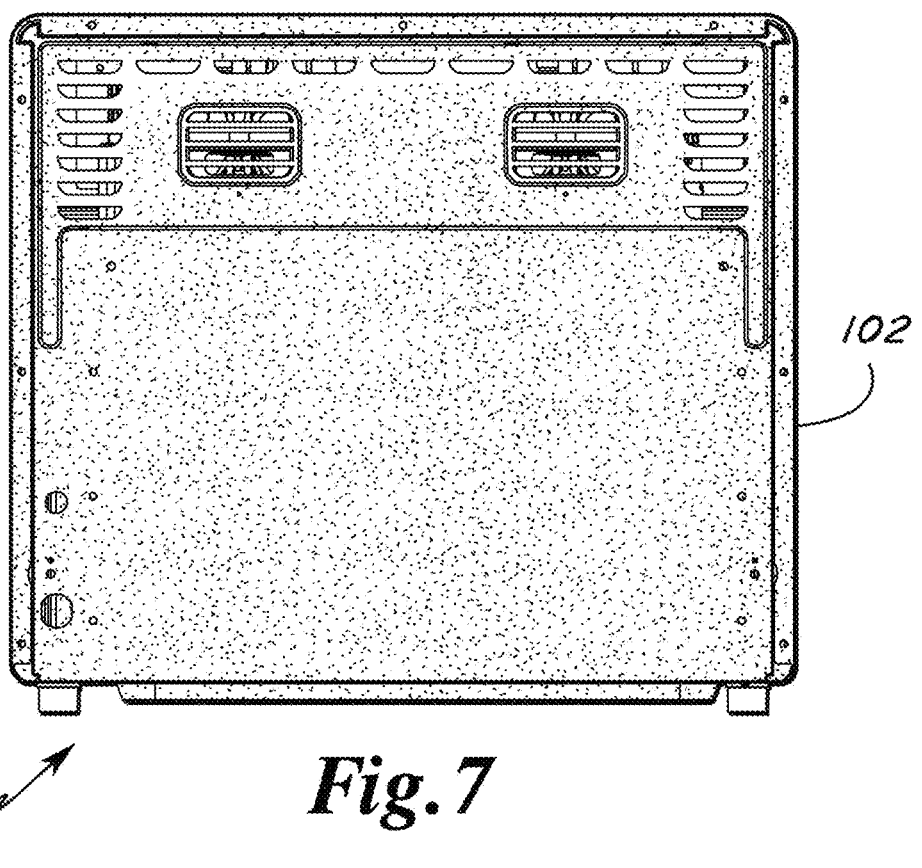
FIG. 7 is a rear view of the oven of FIG. 1.
Figure 8:
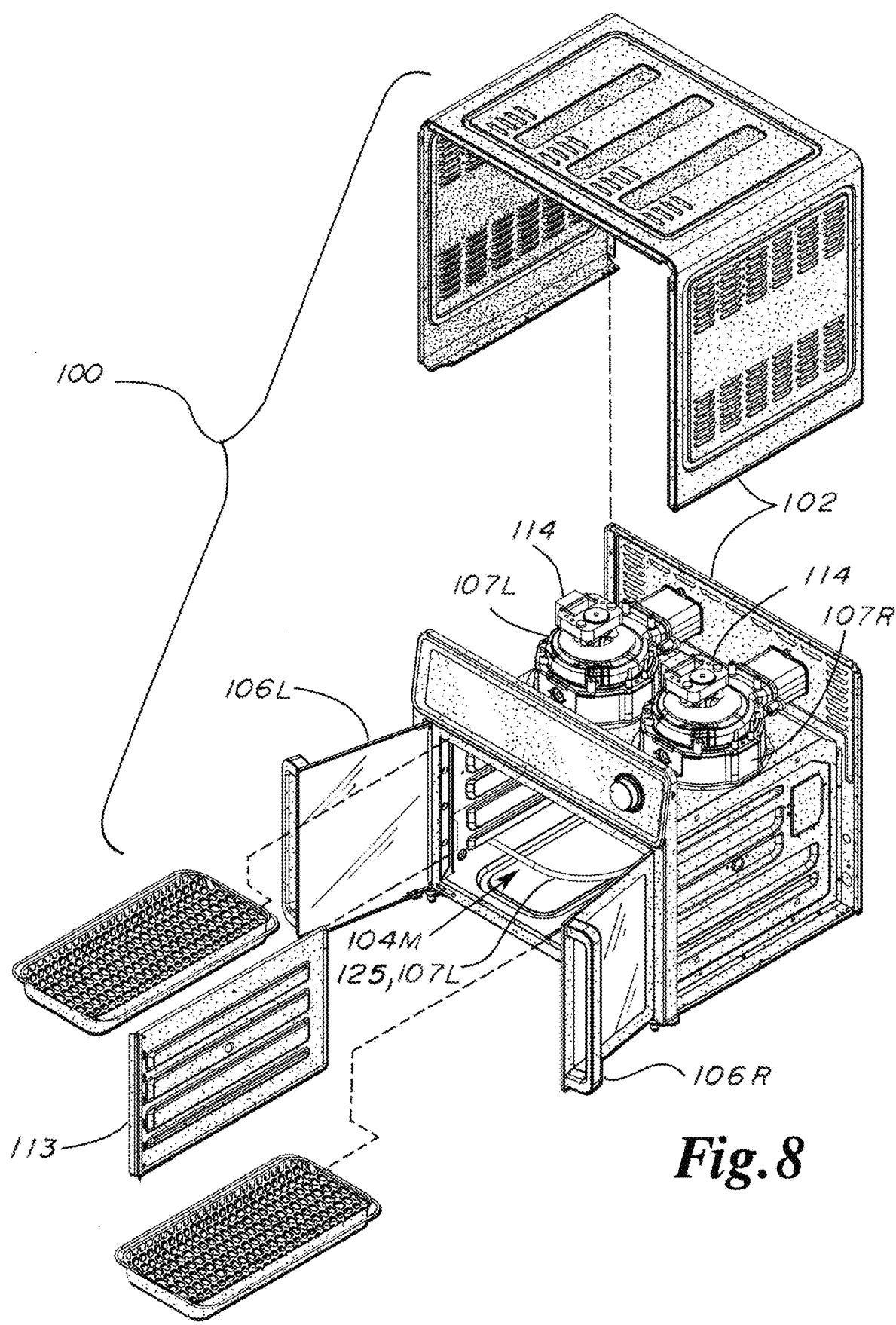
FIG. 8 is an exploded view of the oven of FIG. 1.
Figure 10A:
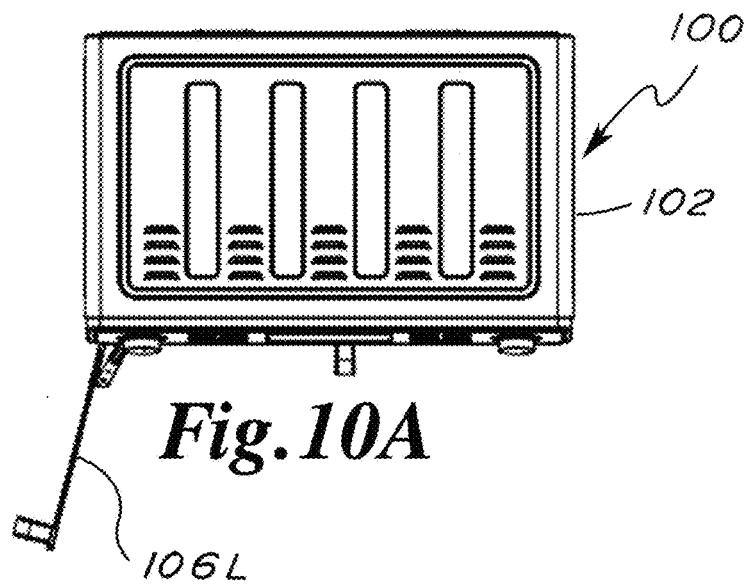
FIG. 10A is a top view of the oven of FIG. 1 with its left door opened.
Figure 10B:
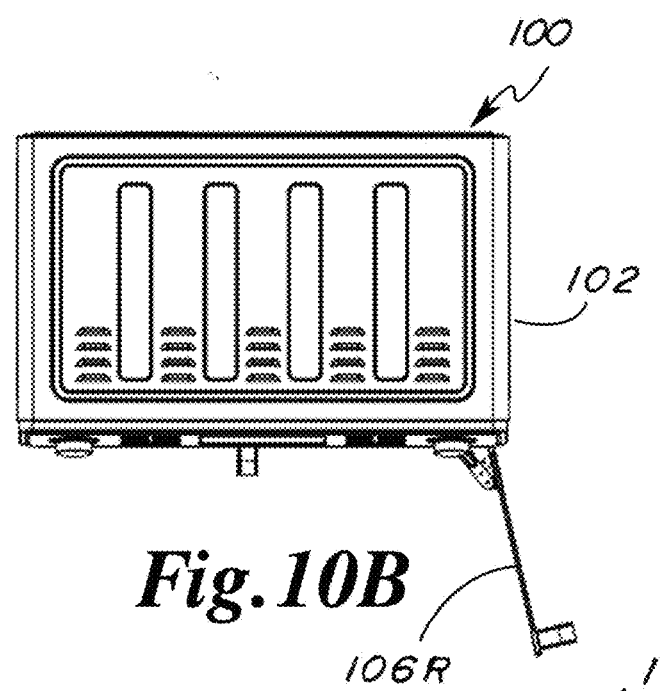
FIG. 10B is a top view of the oven of FIG. 1 with its right door opened.
Figure 10C:
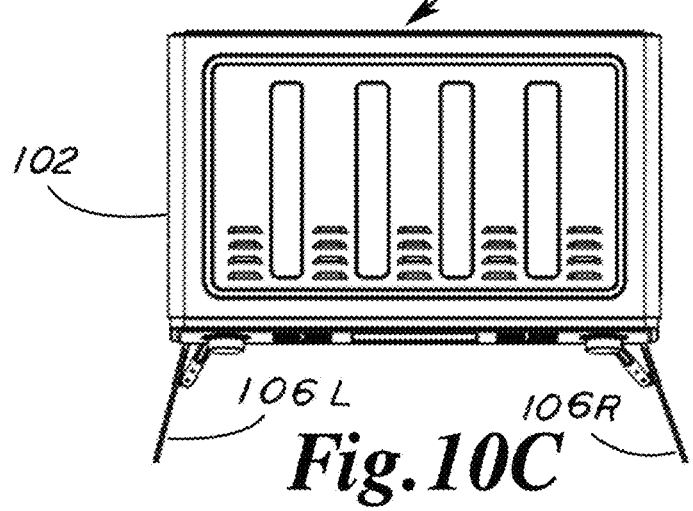
FIG. 10C is a top view of the oven of FIG. 1 with both doors opened.

The disclosures of related U.S. Provisional Application Nos. 62/982,999 filed on 28-Feb.-20 and 63/062,541 filed on 7-Aug.-20, co-pending U.S. Utility patent application Ser. No. 17/389,225 filed on 29-Jul.-21, Ser. No. 17/567,535 filed on 3-Jan.-22, Ser. No. 17/518,876 filed on 4-Nov.-21, and Ser. No. 17/679,528 filed on 24-Feb.-22, and U.S. Pat. No. 11,175,048 issued on 16-Nov.-21 are all incorporated herein by reference in their entireties and thereby form part of this Specification.

Referring to FIGS. 1 through 10C there is shown a first exemplary cooking appliance, here embodied as electrical countertop fan-forced convection oven 100. A housing 102 defines a primary cooking cavity 104M. Access doors 106L and 106R allow selective access to the cooking cavity. A first electrical cooking element 107L is disposed at the top left side of the cooking cavity. A second electrical cooking element 107R is disposed at the top right side of the cooking cavity.

Each cooking element includes a top electrical air heating element 108, an electric blower (or fan) 114, a bottom electrical heating element 125 and an NTC thermostat 122 (although any equivalent type of thermostat may be substituted). Each blower is arranged to agitate (turbulize) air within the cooking cavity that has been heated by the associate air heating elements or may operate while one or both of the associated heating elements are off to agitate unheated air, such as during a cool-down period.

A separation panel 113 is removably disposable within the primary cooking cavity to divide the primary cooking cavity into left and right secondary cooking cavities 104L and 104R, respectively. The thermostat associated with each of the secondary cooking cavities monitors the temperature there-within. The separation panel fits into the cooking cavity by sliding into grooves 105T and 105B in the top and bottom, respectively, of the cooking cavity atop.

The cooking cavities are equipped with means to receive and rotate a rotisserie (not shown). Those means include receivers 123 on each inner side wall and in the separator panel, receiver 123M in the separator panel, and a motor (not shown) behind the left inner side wall. A longer rotisserie may be inserted when the separator is not present for use in the primary cooking cavity, or a shorter rotisserie may be inserted into just the left cooking cavity for use therein when the separator panel is used. Rotisseries are well known so, for brevity, further description thereof is not felt to be required here.

The insertion of or absence of the separation panel is sensed by microswitch (or sensor) 109. A controller arrangement 118 includes a primary control 108M to operate both cooking elements and the rotisserie (if selected), a left control 108L to operate only the left cooking element, a right control 108R to operate only the right cooking element, an input interface 111, a primary control timer 112M to time the operation of both cooking elements and the rotisserie (if selected) together, a left control timer 112L to time the operation of only the left cooking element, and a right control timer 112R to time the operation of only the right cooking element.

When the microswitch senses the absence of the separation plate and communicates that to the controller arrangement, the primary control, primary control timer, and rotisserie (if selected) are enabled. When the microswitch senses the insertion of the separation plate and communicates that to the controller arrangement, the left and right controls and control timers are enabled.

The input interface is adapted to manually receive cooking parameters for the controls from a user, including such function as cooking temperature, heating element wattages, cooking time, rotisserie operation, etc., and to independently energize the cooking elements according thereto.

During the enablement of the primary controller, both cooking elements and the rotisserie (if selected) are arranged to function equally (synchronized), at the same cooking temperature, heating element wattages, cooking time, etc. . . . thereby cooperating as a singular primary cooking element (107R+107L), and the primary controller is arranged to average the temperatures sensed by both thermostats.

During the enablement of the secondary controllers, both cooking elements are arranged to function independently, so that the cooking temperatures, heating element wattages, and cooking times can be set independently of each other to thereby cook two distinct foods differently, one in each secondary cooking cavity and each secondary controller is arranged to cooperate with only its associated thermostat.

The controls may energize the cooking elements in a variety of manners to provide the required cooking parameters. For instance, the heating elements may be cycled on and off to obtain the desired cooking temperature, or the heating element wattages may be continuously varied to obtain the desired cooking temperature, or the blower speed (s) may be varied to obtain the desired level(s) of air turbulence.

The bottom heating elements ensure that the temperature of the air is even from top to bottom throughout the cooking cavities, regardless of whether operation of the secondary or primary cooking cavities.

Countries and regions typically limit the amount of power that an electrical appliance of this type may draw. In the US, for example, a 120V appliance is limited to draw 15 A or 1800 W. So in the present case the wattage consumption of each secondary cooking element is limited to 1800 W when only that secondary cooking element is in use, and the wattage consumption of each secondary cooking element is limited to 900 W when both secondary cooking elements are in use only, thereby limiting the wattage consumption of the primary cooking element to 1800 W.

The left and right access doors allow the user to open only one of the cooking cavities as needed and to thereby avoid any effect on the other.

Figure 11:
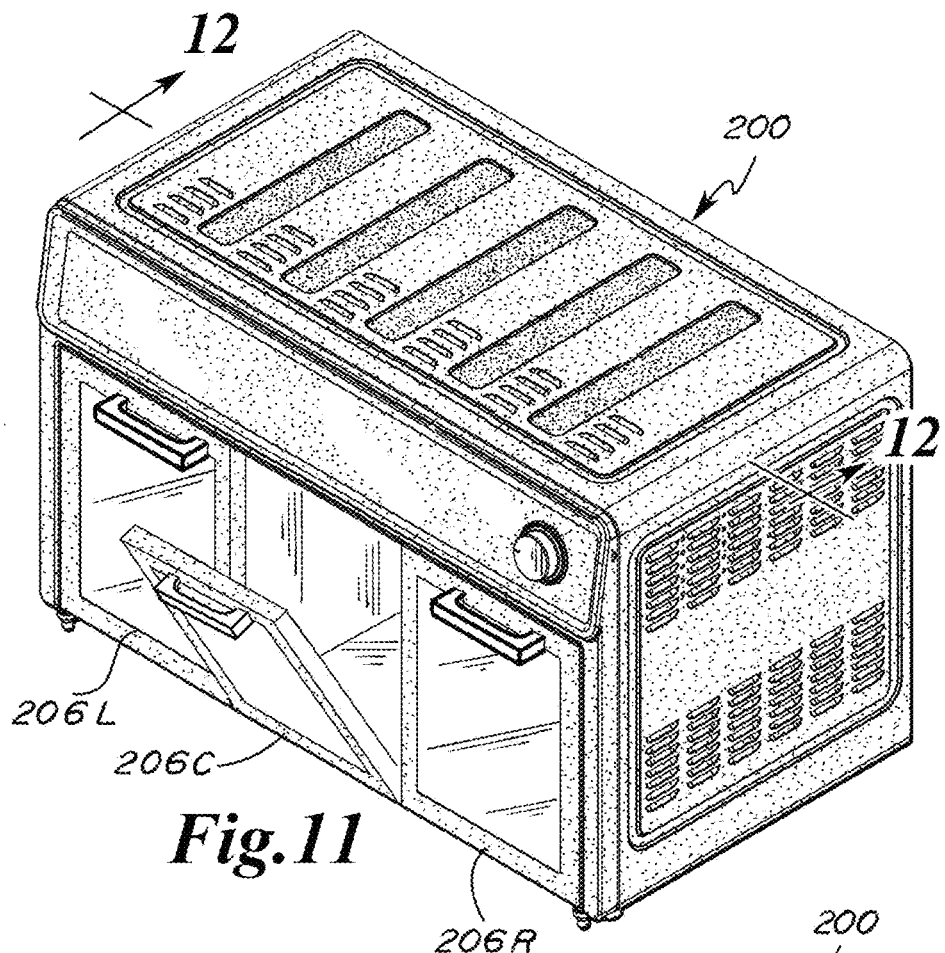
FIG. 11 is a perspective view of a second oven.
Figure 12:
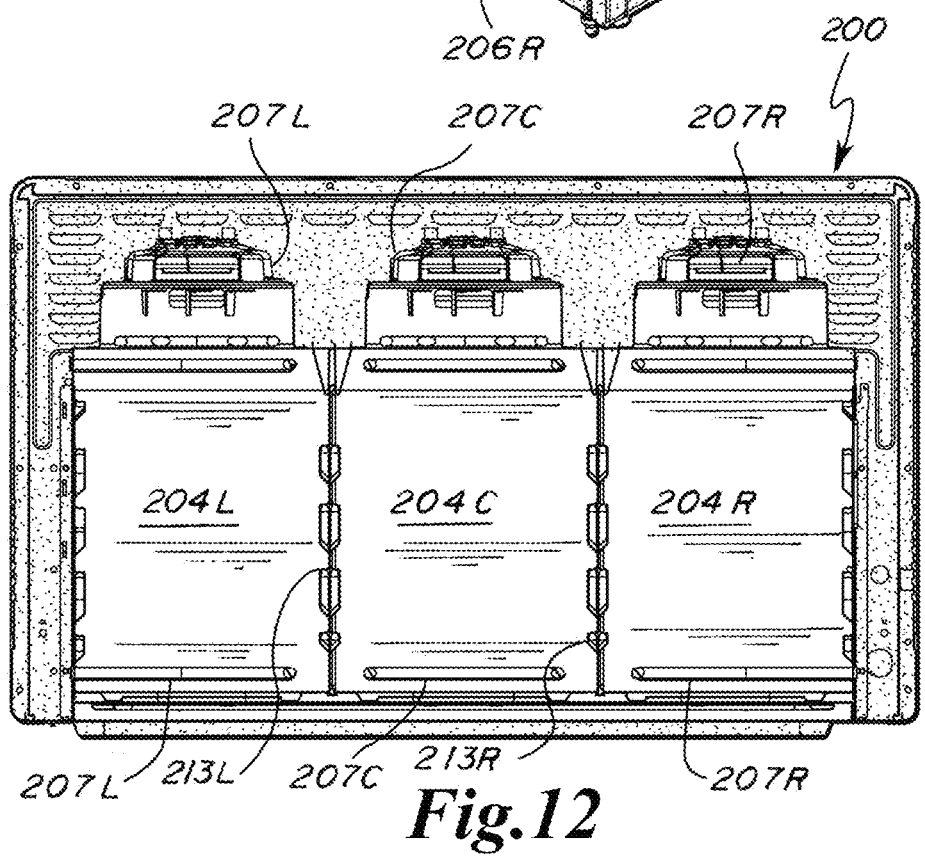
FIG. 12 is a front cross-sectional view of the oven of FIG. 11 taken at line 12-12 of FIG. 11.

A second exemplary cooking appliance is shown in FIGS. 11 and 12 to demonstrate that the invention can be further practiced with more than two cooking cavities . . . in this case in a similar appliance 200 having three electrical cooking elements 207L, 207C and 207R, three secondary cooking cavities 204L, 204C and 204R, two separator panels 213L and 213R, three downwardly-opening access doors 206L, 206C, and 206R. Construction and function not described follows the teachings of the first embodiment except in accordance with the number of cooking chambers of the particular design . . . undescribed components and functions being obviously increased as appropriate.

A third exemplary cooking appliance is shown in FIGS. 13 and 14. This embodiment is identical to the first embodiment in all aspects except those that follow.

This embodiment has no lower cooking elements so that the first and second electrical cooking elements 107L and 107R consist only of top electrical air heating elements 108. When used together as a single primary cooking element, the wattage drawn by each will be equal and up to 900 W so that the total wattage drawn by both cannot exceed 1800 W. When separated into ovens and each functioning as an independent secondary cooking element, the wattage drawn by each is limited to 1800 W, but the total wattages drawn by both also cannot exceed 1800 W. So for instance, if one of the elements is drawing 900 W, the other is limited to 900 W, if one of the elements is drawing 1200 W, the other is limited to 600 W, and if one of the elements is drawing 1800 W, the other is disabled.

Alternatively, both heating elements could be cycled so that one's wattage is increased while the other's is decreased as shown on FIG. 15, where one element is operated at 1800 W while the other is 0 W, and then vice-versa, in a continuous cycle. The elements could also be similarly cycled at 1200 W/600 W or at any variation that does not allow both elements to have a total wattage over 1800 W. A particular advantage of this scheme is that it allows higher wattage than usual according to some safety codes which limit continuous wattage consumption to a lower limit than non-continuous. So where a certain heating appliance may be limited to say 1500 W in some jurisdictions if operated continuously, it may be allowed to operate at say 1800 W temporarily, as long as its average wattage over a period of time is below a certain level.

Alternatively, both heating elements 107L and 107R could each be consisting of a pair of independent heating elements, individually selectable, so that user or program can define the optimal wattage allocated to each function or program. While the total power of these heating elements could be above the limit of 1800 W, for example using 2 heating elements of 600 W per side, totaling 2400 W—when used together as a primary cooking elements, an electronic controller could control the total wattage drawn to be equal and up to 1800 W, but the power could be cycled and distributed among the 4 heating portions in a way that maximizes the power used in each cavity, by alternance, in a way to increase the maximum power available in each cavity. For example one cavity could during the first cycle draw 600 W+600 W=1200 W, while the second cavity would only draw 600 W, and in the next cycle, the first cavity would be only drawing 600 W, while the other cavity would this time draw 1200 W. Keeping some power available in the other cavity prevents a full temporary shut-off of the heat distribution during the cycle period in the said cavity, allowing the food to keep cooking more efficiently even when the power levels are limited, and promoting faster cooking times.

Figure 16:
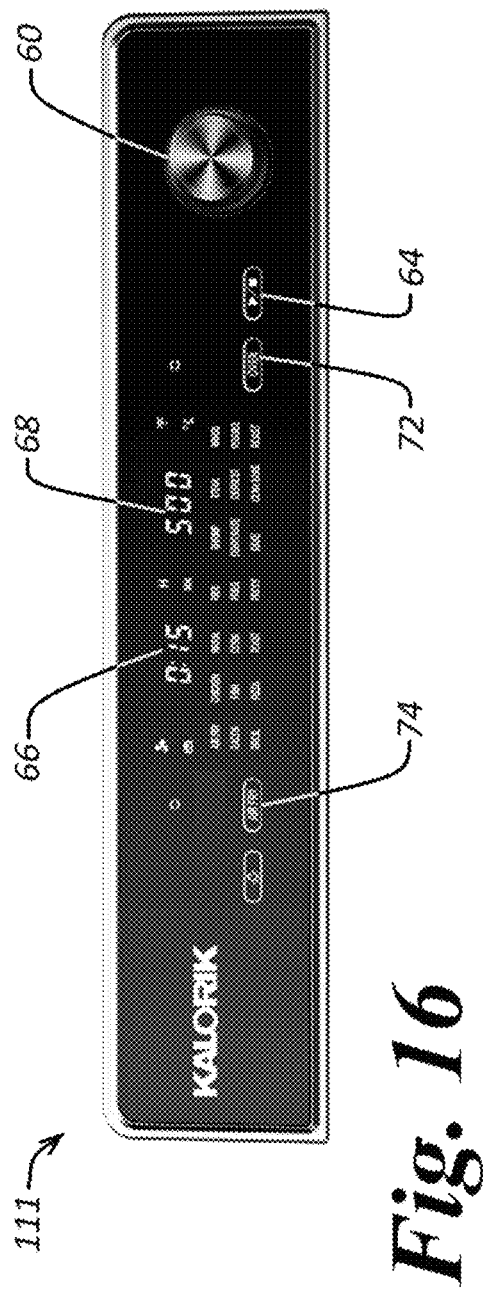
FIG. 16 a view of the control panel of the ovens of FIGS. 1 and 13 during use as a single oven.
Figure 17:
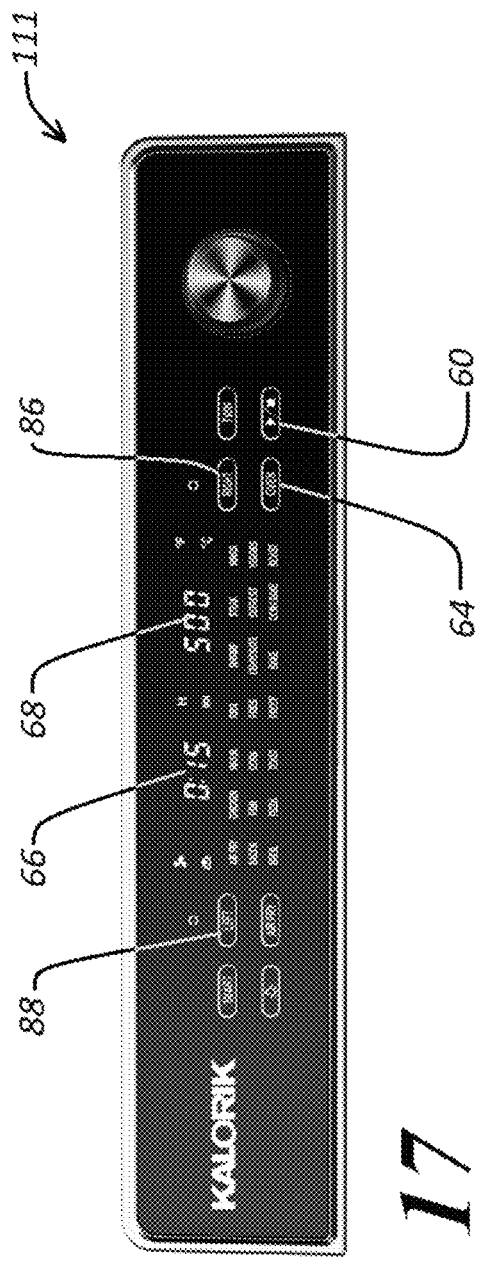
FIG. 17 a view of the control panel of the ovens of FIGS. 1 and 13 during use as a double oven.

FIGS. 16 and 17 depict the input interface 111 in greater detail, which arrangement is found to provide an ease of operation not found in the prior art when switching between use of the primary cooking cavity or the secondary cooking cavities.

The interface includes a rigid printed circuit board covered by a mylar layer. Embedded into the PC board are switches with associated indicators, and condition indicators, all connected to the circuitry printed onto the board. Dial 60 is mounted to the board and includes a shaft (not seen) that protrudes through a hole (not seen) in the layer to receive a knob. The mylar layer is opaque except for transparent portions overlaying the indicators to allow viewing thereof, and has graphics printed thereon as appropriate for identification of certain of the switches and indicators. The indicators are LEDs, or may alternatively be back-lit LCDs. The switches are preferably membrane switches which are activated by localized pressure through the mylar layer.

Universal condition and switch indicators are lit during both primary and secondary cooking, such as power switch 64, a timer display 66, and a temperature display 68. As shown in FIG. 16, primary condition and switch indicators are lit when the power is on and the presence of the separation panel 113 is not sensed. The primary switches associated with primary operation then become activated. These include "Oven" switch 72 and "Airfry" switch 74. Other switches not useful during primary operation are de-activated and other indicators are unlit. This simplifies operation of the appliance as a single large air frying oven.

As shown in FIG. 17, secondary condition and switch indicators are lit when the power is on and presence of the separation panel 113 is sensed. The secondary switches associated with secondary operation of the two side-by-side smaller ovens then become activated. These include "Right" switch 86 and "Left" switch 88. This simplifies operation of the appliance as two independent side-by-side smaller air frying ovens. The user simply presses the "Right" switch 86 to view a control panel layout that is dedicated to operation of the rightmost oven and presses the "Left" switch 88 to view a control panel layout that is dedicated to operation of the leftmost oven.

The function of the dial is also transformed according to primary, secondary-right, and secondary-left operation, allowing the user to scroll through functions and indications associated with the particular operation in use.

Another benefit of the arrangement of the appliance lies in the use of opposing French doors to gain access within the oven/ovens. Because the separation panel, when used, is positioned centrally and vertically, and bisects the primary oven into two identical secondary ovens, and because the French doors are equally in size and meet at a vertical seem that overlies the separation panel, one of the doors may be opened to expose only one of the smaller secondary ovens. This prevents the inadvertent and undesirable escape of heat from the other oven.

While the arrangements shown position the secondary cavities in a horizontal side-by-side arrangement, it is also anticipated that the arrangement could a vertical top-to-bottom one.

And while the arrangements shown include fan-forced convection cooking elements to obtain fan-forced convection cooking, other types of elements/ovens may be substituted without escaping the boundaries of the invention. For instance, the concept could be similarly applied to an oven having radiant or tubular top heating elements without fans to obtain convection-only cooking.

While the invention has been shown and described with reference to specific exemplary embodiments, it should be understood by those skilled in the art that various changes in form and detail may be made without departing from the spirit and scope of the invention, and that the invention should therefore only be limited according to the following claims, including all equivalent interpretation to which they are entitled.

The invention claimed is:

1. A cooking appliance adapted to perform either as a single primary fan-forced convection oven of a first volume, capable of cooking foods of a first size, or as two secondary independently-operable fan-forced convection ovens of volumes smaller than the first volume, each only capable of cooking foods of sizes smaller than the first size, and comprising:
   a housing defining a primary cooking cavity including two cooking element systems, two independently operable access doors, and one user-installable and removable separation panel;
   two independently-operable sub-controllers, each associated with and adapted to independently operate one of the cooking element systems;
   a primary controller associated with and adapted operate both of the cooking element systems as a synchronized single primary system;
   a sensor or switch adapted to communicate the presence or absence of the separation panel to the controller and sub-controllers; and
   a multi-function user interface communicating with the controller and sub-controllers to provide either a first interface arrangement associated with only the primary cooking cavity and primary controller during absence of the separation panel, or a secondary interface arrangement associated with only the secondary cooking cavities and the sub-controllers during presence of the separation panel; wherein
   the separation panel, when present, is adapted to divide the primary cooking cavity into two separate secondary cooking cavities, each secondary cooking cavity including one of the cooking element systems and each secondary cooking cavity being accessible through only one of the access doors;
   the cooking element systems each include a top air heating element assembly disposed within an upper portion of its associated secondary cooking cavity and a bottom air heating element disposed within a lower portion of its associated secondary cooking cavity; both adapted to heat air within either the primary cooking cavity or its associated one of the secondary cooking cavities; and
   each top air heating element assembly comprises a circular heating element in cooperation with a fan and adapted together to heat and turbulize the air within the primary cooking cavity or that associated one of the secondary cooking cavities and adapted to direct the heated and turbulized air downward and parallel to the access doors;
   further comprising a total wattage consumption being a total of first and second individual wattage consumptions of each cooking element system, and further comprising a maximum wattage consumption, wherein the sub-controllers are adapted to cooperate to allow each of the first or second individual wattage consumptions to be up to the maximum wattage consumption while the other of the individual wattage consumptions is reduced to prevent the total wattage consumption from exceeding the maximum wattage consumption during presence of the separator, and wherein
   the primary controller is adapted to limit each of the first and second individual wattage consumptions to half or less of the maximum wattage consumption during absence of the separator.

2. The cooking appliance of claim 1 in which each sub-controller controls functions of its associated cooking element system including one or more of temperature, heating wattage, cooking time, and fan speed.

3. The cooking appliance of claim 2 in which the functions of each cooking element system may be independently controlled of the functions of the other during presence of the separation panel.

4. The cooking appliance of claim 3 wherein sensing of an absence of the separator panel by the separator panel sensor enables the primary controller to cause the synchronization of the functions of both sub-controllers so that the appliance operates as the synchronized single primary fan-forced convection oven employing the primary cooking cavity and both of the cooking element systems.

5. The cooking appliance of claim 4 wherein the synchronization of the functions of both sub-controllers causes the functions of both of the cooking element systems equally as a singular primary cooking element system.

6. The cooking appliance of claim 5 wherein the functions of the singular primary cooking element system include one or more of temperature, heating wattage, cooking time, and fan speed.

7. The cooking appliance of claim 6 wherein the maximum wattage consumption is that allowed for a 15 A electric circuit.

8. The cooking appliance of claim 7 wherein the two independently-operable access doors are horizontally-opening French doors.

9. The cooking appliance of claim 8 wherein each of the independently-operable horizontally opening French doors enables access to only its associated one of the cooking cavities.

10. A cooking appliance adapted to perform either as a single primary fan-forced convection oven of a first volume, capable of cooking foods of a first size, or as two secondary independently-operable fan-forced convection ovens of volumes smaller than the first volume, each only capable of cooking foods of sizes smaller than the first size, and comprising:
    a housing defining a primary cooking cavity including two cooking element systems, two independently operable access doors, and one user-installable and removable separation panel;
    two independently-operable sub-controllers, each associated with and adapted to independently operate one of the cooking element systems;
    a primary controller associated with and adapted operate both of the cooking element systems as a synchronized single primary system;
    a sensor or switch adapted to communicate the presence or absence of the separation panel to the controller and sub-controllers; and
    a multi-function user interface communicating with the controller and sub-controllers to provide either a first interface arrangement associated with only the primary cooking cavity and primary controller during absence of the separation panel, or a secondary interface arrangement associated with only the secondary cooking cavities and the sub-controllers during presence of the separation panel; wherein
    the separation panel, when present, is adapted to divide the primary cooking cavity into two separate secondary cooking cavities, each secondary cooking cavity including one of the cooking element systems and each secondary cooking cavity being accessible through only one of the access doors;
    the cooking element systems each include a top air heating element assembly disposed within an upper portion of its associated secondary cooking cavity and a bottom air heating element disposed within a lower portion of its associated secondary cooking cavity; both adapted to heat air within either the primary cooking cavity or its associated one of the secondary cooking cavities;
    the separation panel comprises a vertical wall installable centrally in the primary cooking cavity between the cooking element systems;
    each top air heating element assembly comprises a circular heating element in cooperation with a fan and adapted together to heat and turbulize the air within the primary cooking cavity or that associated one of the secondary cooking cavities and adapted to direct the heated and turbulized air downward and parallel to the access doors; and
    the two independently operable access doors abut at a vertical seam aligned with the vertical wall and open horizontally outwardly therefrom such that the opening of one of the doors only allows access to a single associated one of the secondary cooking cavities and thereby only allows escape of the heated and turbulized air of that cavity;
    further comprising a total wattage consumption being a total of first and second individual wattage consumptions of each cooking element system, and further comprising a maximum wattage consumption, wherein
    the sub-controllers are adapted to cooperate to allow each of the first or second individual wattage consumptions to be up to the maximum wattage consumption while the other of the individual wattage consumptions is reduced to prevent the total wattage consumption from exceeding the maximum wattage consumption during presence of the separator, and wherein
    the primary controller is adapted to limit each of the first and second individual wattage consumptions to half or less of the maximum wattage consumption during absence of the separator.

11. The cooking appliance of claim 10 in which each sub-controller controls functions of its associated cooking element system including one or more of temperature, heating wattage, cooking time, and fan speed.

12. The cooking appliance of claim 11 in which the functions of each cooking element system may be independently controlled of the functions of the other during presence of the separation panel.

13. The cooking appliance of claim 12 wherein sensing of an absence of the separator panel by the separator panel sensor enables the primary controller to cause the synchronization of the functions of both sub-controllers so that the appliance operates as the synchronized single primary fan-forced convection oven employing the primary cooking cavity and both of the cooking element systems.

14. The cooking appliance of claim 13 wherein the synchronization of the functions of both sub-controllers causes the functions of both of the cooking element systems equally as a singular primary cooking element system.

15. The cooking appliance of claim 14 wherein the functions of the singular primary cooking element system include one or more of temperature, heating wattage, cooking time, and fan speed.

16. The cooking appliance of claim 15 wherein the maximum wattage consumption is that allowed for a 15 A electric circuit.

17. The cooking appliance of claim 16 wherein the two independently-operable access doors are horizontally-opening French doors.

18. The cooking appliance of claim 17 wherein each of the independently-operable horizontally opening French doors enables access to only its associated one of the cooking cavities.

\* \* \* \* \*